(12) United States Patent
Peters

(10) Patent No.: US 7,397,015 B2
(45) Date of Patent: Jul. 8, 2008

(54) METAL CORED ELECTRODE FOR OPEN ROOT PASS WELDING

(75) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 163 days.

(21) Appl. No.: 11/403,411

(22) Filed: Apr. 13, 2006

(65) Prior Publication Data

US 2007/0241087 A1  Oct. 18, 2007

(51) Int. Cl.
*B23K 9/09* (2006.01)

(52) U.S. Cl. .............................. 219/137 PS; 219/130.51

(58) Field of Classification Search ............ 219/130.51, 219/137 PS, 74
See application file for complete search history.

(56) References Cited

U.S. PATENT DOCUMENTS

| | | | |
|---|---|---|---|
| 4,972,064 A | 11/1990 | Stava | |
| 5,001,326 A | 3/1991 | Stava | |
| 5,676,857 A | 10/1997 | Parker | |
| 5,742,029 A | 4/1998 | Stava | |
| 5,961,863 A | 10/1999 | Stava | |
| 5,981,906 A | 11/1999 | Parker | |
| 6,051,810 A | 4/2000 | Stava | |
| 6,093,906 A | 7/2000 | Nicolson et al. | |
| 6,160,241 A | 12/2000 | Stava | |
| 6,204,478 B1 | 3/2001 | Nicholson | |
| 6,215,100 B1 | 4/2001 | Stava | |
| 6,274,838 B1 * | 8/2001 | Demers et al. | ................ 219/74 |
| 6,274,845 B1 | 8/2001 | Stava | |

OTHER PUBLICATIONS

International Search Report dated Jan. 18, 2008.

* cited by examiner

*Primary Examiner*—Clifford C Shaw
(74) *Attorney, Agent, or Firm*—Fay Sharpe LLP; Brian E. Turung

(57) ABSTRACT

A method and apparatus of forming a root bead in a gap between spaced ends of at least one workpiece. The gap includes an open root. A metal cored electrode having a metal sheath and core materials is used to for the root bead in the open root. The core materials include little or no flux agents. The metal cored electrode is advanced at a given wire feed rate toward the open root to weld the ends together by at least partially filling the open root in a first weld pass. A welding current having a controlled waveform is used. The waveform includes a succession of welding cycles each having a short circuit portion and a metal the metal cored electrode and to cause the metal cored electrode to melt and transfer to the ends in the open root to form a root bead. The formed root bead has little or no slag on the upper surface of the root bead. A shielding gas is used to at least partially protect the molten metal in the open root from the atmosphere.

29 Claims, 4 Drawing Sheets

METAL CORED ELECTRODE FOR OPEN ROOT PASS WELDING

The present invention relates to a method of short circuit welding, and more particularly to a method of short circuit welding of an open root, and still even more particularly to a method of short circuit welding of an open root by use of a metal cored electrode, and yet even more particularly to a method of short circuit welding of an open root by use of a metal cored electrode and with a specific power supply known in the welding industry as the STT electric arc welder.

INCORPORATION BY REFERENCE

Short circuit electric arc welding has been to weld together large plates for many specific welding applications. This type of short circuit electric arc welder is sold by The Lincoln Electric Company of Cleveland, Ohio under the trademark STT and is disclosed in U.S. Pat. Nos. 4,972,064; 5,001,326; 5,742,029; 5,961,863; 5,981,906; 6,051,810; 6,160,241; 6,204,478; 6,215,100 and 6,274,845, all of which are incorporated herein by reference. This unique short circuit electric arc welder has become a very popular power supply when welding together spaced ends of one or more workpieces such as the formation of a pipe or the welding together of pipe sections when laying pipe lines in the field. The implementation of a pipe welding method utilizing the unique short circuit welder is disclosed in U.S. Pat. Nos. 5,676,857 and 5,981,906, which are incorporated herein by reference. These patents and the material disclosed therein define the STT welder by The Lincoln Electric Company and its application to welding plates such as, but not limited to, pipe sections, and such patents are incorporated by reference herein as background information so that this known technology need not be repeated. Certain concepts regarding the use of a flux cored electrode and/or the use of reverse polarity welding by the STT welder is disclosed in U.S. Pat. Nos. 5,961,863; 6,051,810; 6,160,241; 6,204,478; 6,215,100 and 6,274,845. These prior patents are also incorporated by reference herein as background information and for technology which also need not be repeated to understand the present invention.

BACKGROUND OF THE INVENTION

Many fabricators of welded metal products use the open root butt joint as a means to join two pieces of metal together. Fabricators are often forced to weld joints from one side when access to both sides is undesirable or at times even impossible. Furthermore, open root joints are generally employed when the use of joint backer materials is not possible.

Within the butt weld, the first pass, or root pass is often the most difficult to make and yet is also the most critical weld of the joint because the weld bead produced by this first pass serves as the bead face on the back side of the weld. The root pass is considered difficult because it has the least access, being the furthest back at the bottom of the joint. Also, it is made upon an open root, without any support from a metal backing from the parent metal or previous weld. The only support of the weld comes from the thin beveled ends on either side of the joint. An open root weld is considered the most critical because the repair of defects can generally not be made from the back side of the weld. In many implementations of welded structures, if even small defects exist in the root bead, premature failure of the weld may result.

Numerous fabricators successfully weld open root butt joints from one side. Applications include pipe welding in the field and fabrication shop, welding structural shapes and plates where access to the back side is not possible. As expected, the root pass of the open root weld must be welded at somewhat slower procedures than other subsequent passes. This ensures the proper workmanship is maintained and the desired weld quality is obtained. Many of these welds are made out of positions requiring even slower procedures to obtain the desired results. Often a production bottleneck occurs around the completion of this root pass of open root welds.

Accordingly, there is a need for an electrode and welding method that produces a high quality root bead of a single sided butt joint, in a relatively simple and time effective manner.

SUMMARY OF THE INVENTION

The present invention relates to a method and apparatus of short circuit arc welding together of one or more metal plates. The present invention is particularly directed to the welding of metal plates having a generally planar or semi-planar profile by an open root welding process; however, it will be appreciated that the welding apparatus and method can be used to weld together other types of metal plates such as, but are not limited to, the edges of two pipe sections, etc. The method and apparatus of short circuit arc welding can be used to weld together the one or more metal plates and to form a root bead between the meal plates; however, the invention has broader applications and can be used to weld together a variety of metal objects, in a variety of ways. In one non-limiting embodiment, the present invention is directed to an apparatus and method for laying the first bead in an open root joint of a plate welding process. In another and/or alternative non-limiting embodiment, the present invention is directed to welding an open root with reduced or little arc force in the center of the open root and produces good penetration on the edges of the metal plates. In still another and/or alternative non-limiting embodiment, the present invention is directed to a method and apparatus for filling an open root between metal plates and for obtaining good penetration across the entire weld. This method and apparatus can use a high frequency switching power supply such as, but not limited to, a POWERWAVE STT welder as offered by The Lincoln Electric Company. Although the invention will be described with particular reference to this type of electric arc welder for use in the formation of a root bead in between metal plates, the STT welder or other electric arc welders can be used to fill the gap between the metal plates after completion of the open root pass. As such, subsequent weld metal layers that are formed after the root bead can be formed by the same type of welder or by another type of welding process (e.g., high heat pulse spray, etc.). The welding process can be a semiautomatic or automatic welding process when forming one or more weld metal layers.

In accordance with one non-limiting aspect of the present invention, there is provided one or more plates such as, but not limited to generally planar metal plates or two pipe sections, which are positioned together and form a groove or open root between the ends of the one or more metal plates, a consumable metal cored electrode, a shield gas to at least partially shield the area about the open root from the atmosphere, and a power supply that includes a welding current circuit which applies a welding current with a particular waveform profile across the open root between the one or more metal plates.

In accordance with another and/or alternative non-limiting aspect of the present invention, the edges of one metal plate or the edges of two or more metal plates can be aligned together by the use of clamps and/or other alignment arrangements so as to minimize the amount of offset of the edges. The clamps and/or other alignment arrangements also and/or alternatively maintain the one or more metal plates together at least until a root bead has been applied to the open root between the one or more metal plates. In one non-limiting embodiment of the invention, the edges of the one or more metal plates are aligned such that a small gap exists in the open root that is formed by the one or more two metal plates. In one non-limiting aspect of this embodiment, the gap is less than about 10 mm. In another and/or alternative non-limiting aspect of this embodiment, the gap is at least about 0.5 mm. In still another and/or alternative non-limiting aspect of this embodiment, the gap is at least about 1 mm. In yet another and/or alternative non-limiting aspect of this embodiment, the gap is up to about 5 mm. In another and/or alternative non-limiting embodiment of the invention, the use of clamps and/or other alignment arrangements minimize or eliminate the amount of misalignment of the edges of the one or more metal plates that form the open root between the metal plates so as to improve the quality of the formed weld bead. In one non-limiting aspect of this embodiment, the amount of misalignment of the edges of the one or more metal plates that form the open root are up to about ±4 mm. In another and/or alternative non-limiting aspect of this embodiment, the amount of misalignment of the edges of the one or more metal plates that form the open root are up to about ±2 mm. In still another and/or alternative non-limiting aspect of this embodiment, the amount of misalignment of the edges of the one or more metal plates that form the open root is up to about ±1 mm.

In accordance with still another and/or alternative non-limiting aspect of the present invention, a welding carriage can be provided for use in the root pass during the formation of the root bead. The welding carriage is generally used for the welding of pipe; however, this is not required. As can be appreciated, the welding carriage can be used for additional passes of the consumable electrode to fill the gap between the metal plate after the root bead has been applied. In one non-limiting embodiment of the invention, the welding carriage can be used to form the root bead during the welding together of two pipe sections. In this arrangement, the welding carriage can extend at least about 90° about the circumference of the groove or gap between the pipe sections. In one non-limiting aspect of this embodiment, the welding carriage can extend at least about 180° about the circumference of the groove or gap between the pipe sections. In another non-limiting aspect of this embodiment, the welding carriage can extend about 360° about the circumference of the groove or gap between the pipe sections. The welding carriage is generally designed to move or slide along a track as it moves around a portion or the complete circumference of the groove or gap between the pipe sections. One or more welding carriages can be used to form the root bead. The track is typically positioned about and/or secured to the periphery of one or both of the pipe sections. The welding carriage typically includes a drive motor which enables the welding carriage to move along the track at least partially around the circumference of the groove or gap at a desired speed. The movement speed of the welding carriage along the track can be constant or variable. The welding carriage can include a mechanism that controllably moves the consumable cored electrode toward and/or away from the groove or gap during the welding process. The mechanism for controlling the movement of the cored electrode may be integrated with or separate from the mechanism for controllably moving the carriage about to the groove or gap during the welding process. Non-limiting welding carriage configurations and/or operations that can be used in accordance with the present invention are disclosed in U.S. Pat. Nos. 5,677,857 and 5,981,906, both of which are incorporated herein by reference.

In accordance with yet another and/or alternative non-limiting aspect of the present invention, the welding current circuit used for the root bead in the groove or gap formed by the metal plates can include a first circuit and a second circuit. The first circuit can be used to control the current flow during the short circuit condition wherein the molten metal at the end of the consumable cored electrode is primarily transferred into the molten metal pool within the groove or gap by a surface tension action. In one non-limiting embodiment of the invention, the first circuit can by designed to produce a transfer current that includes a high current pinch pulse across the shorted melted metal which helps facilitate the transfer of the molten metal from the electrode to the weld pool. The second circuit can be designed to form a melting current. In another and/or alternative non-limiting embodiment of the invention, the melting current can be a high current pulse which is passed through the welding arc to melt the metal at the end of the consumable cored electrode when the electrode is spaced from the welding pool. In one non-limiting aspect of this embodiment, the high current pulse can have a preselected amount of energy or wattage that is used to melt a relatively constant volume of metal at the end of the consumable cored electrode. In another and/or alternative non-limiting aspect of this embodiment, the second circuit of the welding current circuit can provide a high energy boost during the initial portion of the arcing condition. The high current boost can have a preselected I(t) area or energy for melting a relatively constant volume of metal on the end of the consumable metal cored electrode when the metal cored electrode is spaced from the welding pool; however, this is not required. The energy created during the plasma boost is typically sufficient to create a generally spherical metal ball having a diameter of no more than about twice the diameter of the metal cored electrode; however, it can be appreciated that other shapes and/or sizes of the molten metal ball can be achieved during the plasma boost. In still another and/or alternative non-limiting aspect of this embodiment, the second circuit of the welding current circuit can provide current to the consumable cored electrode so that after the initial high current plasma boost current, the high current is maintained for a period of time and then reduced. In one non-limiting arrangement, the high current can be maintained for a preselected period of time. In another and/or alternative non-limiting arrangement, the reduction in current can be achieved by decaying the current over a period of time until the desired amount of energy or wattage is applied to the electrode to melt the desired volume of the electrode; however, it can be appreciated that the reduction in current can be achieved in other or additional ways. In still another and/or alternative non-limiting embodiment of the invention, the welding current circuit can limit the amount of energy directed to the consumable electrode so as to prevent unnecessary melting of the ends of the metal plates during the application of the weld bead and/or to prevent the weld bead from becoming too hot during welding to thereby inhibit or prevent molten metal from passing through the gap between the ends of the metal plates. In still another and/or alternative non-limiting embodiment of the invention, the welding current circuit can include a circuit to produce a background current. The background current can be a low level current which is maintained just above the level necessary to sustain an arc after the termination of a short circuit condition. The background current can be maintained throughout the welding cycle to insure that the arc is not inadvertently extinguished during welding; however, this is not required. In yet another and/or alternative non-limiting embodiment of the invention, the welding current can include a controller that is designed to shift the current polarity during the welding process to obtain a desired weld puddle heat. The polarity can be shifted during a welding cycle, and/or after one or more welding cycles have been completed. When using an electrode positive process of a short circuit welder such as, but not limited to an STT welder, the workpiece puddle can be too hot and the cooling of the puddle requires time to allow the weld bead to pull back in the groove or gap. As a result, the short circuit welding process such as, but not limited to an STT process, can reduce the background current to reduce the heat in the puddle. This reduction in background current decreases the amount of heat in the total welding process. As such, the short circuit welding process such as, but not limited to an STT process, can be designed to switch between the standard electrode negative polarity and the electrode positive polarity during the welding process to adjust the amount of heat directed to the weld puddle. In this manner, the heat to the weld puddle can be controlled without changing the level of the background current; however, it can be appreciated that background current level adjustment can also be used. The heat of the weld puddle can thus be controlled to a selected temperature by adjusting the ratio of negative electrode to positive electrode welding.

In accordance with still yet another and/or alternative non-limiting aspect of the present invention, the welding circuit can be designed so as to compensate for changes in the spacing of the groove or gap between the metal plates. In one non-limiting embodiment of the invention, the variation in the width of the groove or gap during the laying of the initial root bead can be determined by the instantaneous stick out of the consumable electrode. When welding an open root joint having a gap that varies in width, the molten metal puddle has a tendency to sag through the gap when the groove or gap is wide. This physical phenomenon results in an increase in wire stick out. When the groove or gap is narrower, the initial root bead does not penetrate as far into the groove or gap, thus the stick out of the consumable electrode is less. As such, the measuring of the instantaneous stick out of the consumable electrode can be used to measure the relative size of the groove or gap between the metal plates during the welding process. The stick out measurement can be used to determine changes needed in the puddle heat. In one non-limiting aspect of this embodiment, the welding current can be increased when the detected groove or gap size is narrow and the current can be decreased when the detected groove or gap size is wide. In another and/or alternative non-limiting aspect of this embodiment, the detection of the size of the groove or gap can be used to inhibit or prevent the weld puddle from falling through the groove or gap. As the size of the gap increases, the weld puddle tends to fall through the gap. The beginning of this event can be achieved by sensing an increase in the electrode stick out. This increased stick out can be used to reduce the heat of the weld puddle by reducing the weld current to the consumable electrode, thereby causing the weld puddle temperature to decrease. The decrease in puddle temperature in turn causes partial or full solidification of the molten metal thereby inhibiting or preventing the metal from falling or passing through the gap (i.e., control of the backside reinforcement of the gap without excessive buildup). When the width of the groove or gap is reduced, the sensed electrode stick out is also reduced since the molten metal has a much less tendency to pass through the gap. As a result, the molten puddle begins to accumulate on the top of the gap, thereby a decrease in the stick out is sensed. When such a decrease in stick out of the consumable electrode is sensed, the welding circuit can be designed to cause the current to increase to thereby increase the heat in the molten metal puddle. The hotter puddle can cause the metal in the puddle to better penetrate into the narrow gap to cause proper fusion of the metal plate ends along the depth of the gap. The current to the consumable electrode can be increased or decreased by increasing or decreasing the background current and/or the current plasma boost current; however, it can be appreciated that other currents can be used. In another and/or alternative non-limiting aspect of this embodiment, the profile of the groove or gap width can be obtained. When a serpentine or weave welding process is used, the consumable electrode moves transversely across the gap during the welding process along the gap, thus the electrode extension varies as the consumable electrode approaches the diverging walls forming the joint. The measurement of stick out can be used to provide information regarding the position of the weld head as it moves the consumable electrode transversely in the open root welding process. This groove or gap profile information can be used to control one or more welding parameters (e.g., weld current, weld head direction, travel speed of the carriage, etc.). The travel speed of the welding tip can be also or alternatively controlled by stick out determinations. For instance, when the stick out becomes too short, the travel speed can be increased, and when the stick out is too long, the travel speed can be decreased. As can be appreciated, one or more properties of the root bead can be measured by other or alternative means (e.g., laser scanning, eddy current analysis, etc.). In still another and/or alternative non-limiting aspect of this embodiment, the measurement of the stick out of the consumable electrode can be used for seam tracking. The sensed stick out information can be used by the mechanism that moves the weld head back and forth during the welding process. The outboard position of the weld head can be detected as a decrease in the electrode stick out. When the weld head moves to the outside portion of the groove or gap, the stick out is small. As the consumable electrode is moved across the gap, the electrode stick out will typically vary in length with the shortest at the outside region of the gap. As the consumable electrode reaches one side of the gap, the consumable electrode is reversed to move toward the other side of the gap. During thus process, the electrode stick out will typically increase and then decrease. The use of this stick out information can be used to control the weld head mechanism by signaling when the transverse movement of the consumable electrode or weld head should be stopped and/or reversed. This action can be used to generate a serpentine or weave pattern of the weld head during the welding operation and allow for joint tracking. In yet another and/or alternative non-limiting aspect of this embodiment, the welding power or heat to the consumable electrode can be changed by the measurement of the stick out of the consumable electrode. As such, as the consumable electrode is moved in the gap, the amount of welding power or heat to the consumable electrode can be changed at selected locations in the gap. For instance, while forming a root bead in a gap, the geometry of the metal plates may be such that more or less heat is required at certain locations in the gap. The measurement of stick out of the consumable electrode can be used to change or adjust the welding power or heat during the formation of the root bead. In still yet another and/or alternative non-limiting aspect of this embodiment, the measured stick out of the consumable electrode can be used for seam tracking during one weld pass so weld head movement can be at least partially controlled by the path of the gap. The path traversed by the weld head in one pass along the gap can be stored in memory. As such, subsequent weld passes of the automatic or semiautomatic welding equipment can be duplicated from the stored gap information from the first pass. As can be appreciated, the stored information can be partially or fully updated with each pass; however, this is not required. In a further and/or alternative non-limiting aspect of this embodiment, the stick out of the consumable electrode can be measured quickly and used in a microprocessor software program to select a desired current wave form from a look up table, ROM, RAM, PROM mathematical calculation, other algorithm, etc. This information can then be used to adjust the weld current to the desired level dictated by the detected sensed stick out of the consumable electrode.

In accordance with a further and/or alternative non-limiting aspect of the present invention, the consumable cored electrode includes one or more alloy metals in the core so as to obtain a weld bead composition which is similar to the composition of or is a desired composition for the one or more metal plates which are being welded together. A weld bead having a composition that closely matches the composition of the one or more metal plates typically forms a strong, durable, high quality weld bead. The use of a metal sheath that includes one or more metal alloying agents can also be used to facilitate in customizing the composition of the formed weld bead to achieve the desired characteristics of the weld bead; however, this is not required. In one non-limiting embodiment of the invention, the sheath is formed of mild steel, low carbon steel or stainless steel. As can be appreciated, the sheath can be formed of other metals. Another and/or alternative one non-limiting embodiment of the invention, the metal cored electrode includes less than 1-2 weight percent slag forming agents. The low content or elimination of slag forming agents in the core of the consumable electrode overcomes the problems associated with slag formation on the root bead or any subsequently formed weld bead. In one non-limiting aspect of this embodiment, the metal cored electrode includes less than about 0.5 weight percent slag forming agents. In still another and/or alternative non-limiting embodiment of the invention, the metal alloying agents in the core of the consumable electrode constitute about 0.5-50 weight percent of the consumable electrode. In one non-limiting aspect of this embodiment, the metal alloying agents in the core of the consumable electrode constitute about 1-30 weight percent of the consumable electrode. In still another and/or alternative non-limiting embodiment of the invention, the size of the metal cored electrode and/or configuration of the metal sheath of the metal cored electrode can be selected to reduce the amount of electric arc force in the center of the arc during the welding process. The reduction of arc force in the center of the arc reduces the tendency of the welding arc to force the molten metal that forms the root weld metal through the groove or gap. The directing of a larger amount of the arc current on the outer region of the metal cored electrode can result in less arc force in the center of the arc and a wider broom of the electric arc. The wider broom of the electric arc can result in a larger amount of the molten metal of the consumable electrode being place on the shoulders or edges of the weld gap as opposed to the center of the groove or gap, thus improved filling of the groove or gap can be achieved with a reduced tendency of the molten metal being forced through the groove or gap. In one non-limiting aspect of this embodiment, the diameter size of the consumable metal cored electrode for use in forming a root weld bead in a gap is at least about 0.03125 inches (0.7 mm). In another and/or alternative aspect of this embodiment, the diameter size of the consumable metal cored electrode for use in forming a root weld bead in a gap is at least about 0.0625 inches (1.6 mm). In still another and/or alternative aspect of this embodiment, size ratio of the diameter size of the consumable metal cored electrode to the width of the gap is at least about 0.1:1. In yet another and/or alternative aspect of this embodiment, size ratio of the diameter size of the consumable metal cored electrode to the width of the gap is about 0.1-2:1. In still yet another and/or alternative aspect of this embodiment, size ratio of the diameter size of the consumable metal cored electrode to the width of the gap is about 0.25-1.4:1. In a further and/or alternative aspect of this embodiment, the ratio of the thickness of the metal sheath wall to the diameter of the metal cored electrode is less than about 0.9:1. By selecting a certain sheath wall thickness, a higher current density of the electric arc along the outer region of the consumable electrode is achieved, thereby promoting the fanning out of the electric arc (e.g., increase broom of arc) and the reduction in the force in the center of the electric arc. In still a further and/or alternative aspect of this embodiment, ratio of the thickness of the metal sheath wall to the diameter of the metal cored electrode is about 0.2-0.8:1.

In accordance with still a further and/or alternative non-limiting aspect of the present invention, a shield gas is used during the formation of the root bead. The shielding gas is used to at least partially shield the molten weld metal from adverse elements and/or compounds in the atmosphere. In one non-limiting embodiment of the invention, the shielding gas includes carbon dioxide, argon, helium, and/or other inert or substantially inert gasses. The shielding gas can also include oxygen. In one aspect of this embodiment, the shielding gas includes a majority of carbon dioxide. In another and/or alternative aspect of this embodiment, the shielding gas includes a majority of carbon dioxide and argon. In still another and/or alternative aspect of this embodiment, the shielding gas includes by volume 10-30% carbon dioxide and 60-90% argon.

One non-limiting object of the present invention is the provision of a short circuiting arc welding system and method which forms a high quality weld bead in a gap formed by one or more metal plates.

Another and/or alternative non-limiting object of the present invention is the provision of a short circuiting arc welding system and method that uses a metal cored electrode to form a high quality weld bead in a gap formed by one or more metal plates.

Still another and/or alternative non-limiting object of the present invention is the provision of a short circuiting arc welding system and method for applying a controlled amount of energy to the electrode to form a weld bead in the gap between one or more metal plate and thereby controlling the backside reinforcement of the gap without excessive buildup of the weld metal in the gap.

Yet another and/or alternative non-limiting object of the present invention is the provision of a short circuiting arc welding system and method that uses a metal cored electrode to produce a weld bead having a composition which is substantially similar to the composition of the one or more metal plates being welded.

These and other advantages will become apparent to those skilled in the art upon the reading and following of this description taken together with the accompanying drawings.

BRIEF DESCRIPTION OF THE DRAWING

Reference may now be made to the drawing, which illustrates an embodiment that the invention may take in physical form wherein.

DETAILED DESCRIPTION OF THE INVENTION

The present invention relates to an apparatus and method of welding the ends of one or more metal plates together such as, but not limited to, two generally planar metal plates, at the open root between the edges of the metal plates by using a metal cored consumable electrode in combination with a short circuit welding process such as, but not limited to, an STT welding process. The invention will be described with particular reference to the use of an STT welding process for the formation of a root bead at the open root that is between the edges of two generally planar metal plates or two pipe sections; however, it will be appreciated that the apparatus and method of the invention is not limited to the welding of generally planar metal plates or pipe sections. Indeed, the method and apparatus of the present invention can be used to form a root bead, and if desired to partially or fully fill the gap between the edges of other metal articles such as, but not limited to, a pipe seam along the longitudinal length of a pipe, etc.

Figure 5:
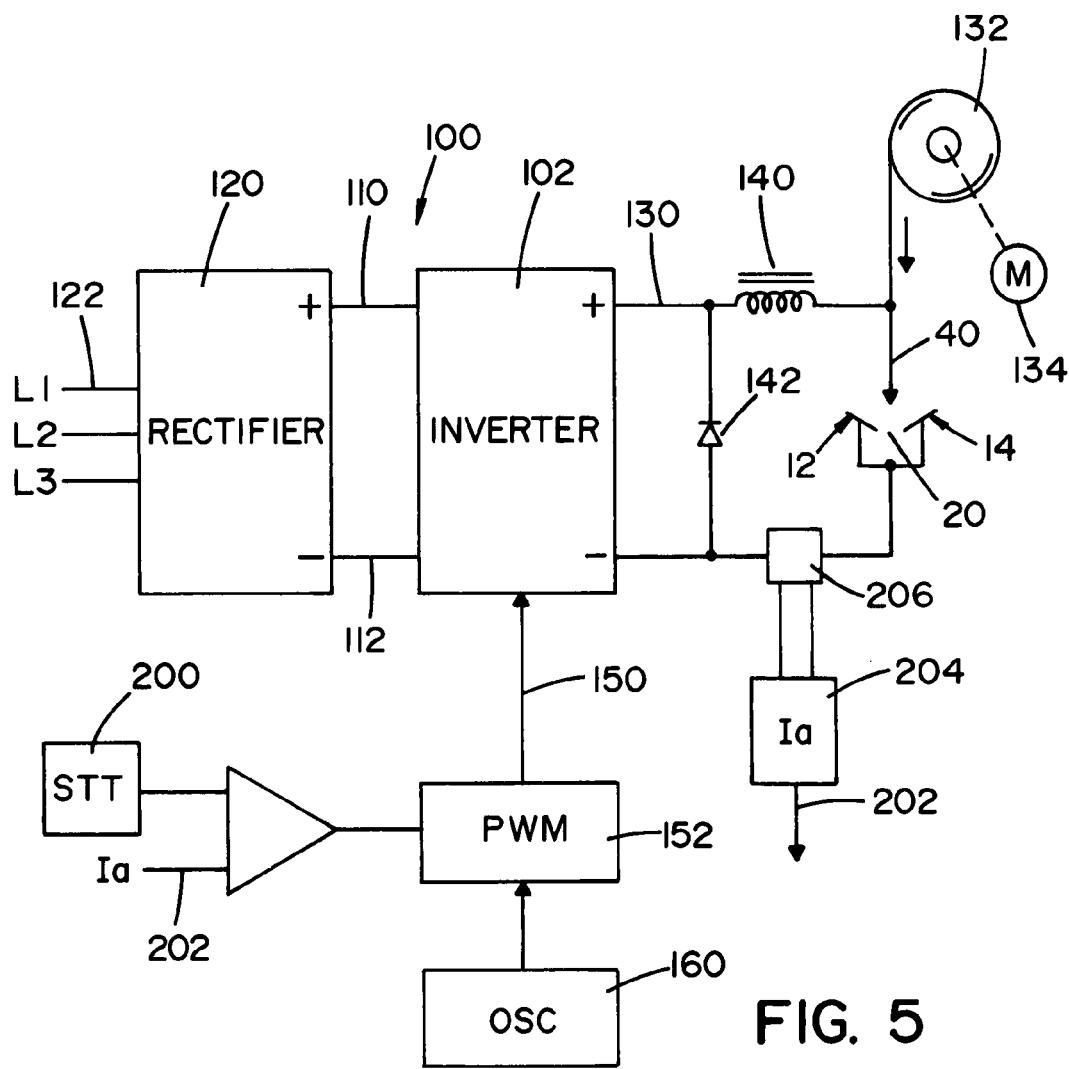
FIG. 5 is a simplified diagram of an STT welder that can be used in the present invention.

Referring now to the drawings wherein the showing is for the purpose of illustrating one non-limiting embodiment of the invention only and not for the purpose of limiting the same, FIG. 5 illustrates a short circuiting arc welding system connected to the output of a DC power supply. The preferred type of short circuiting welding is SURFACE TENSION TRANSFER or STT type of welding. The welding circuit and control arrangement for such type of welding is disclosed in U.S. Pat. Nos. 4,972,064; 5,001,326; 5,742,029; 6,160,241; and 6,215,100, which patents are incorporated herein. Therefore, only a general discussion of the welding circuit will be discussed below.

Figure 6:
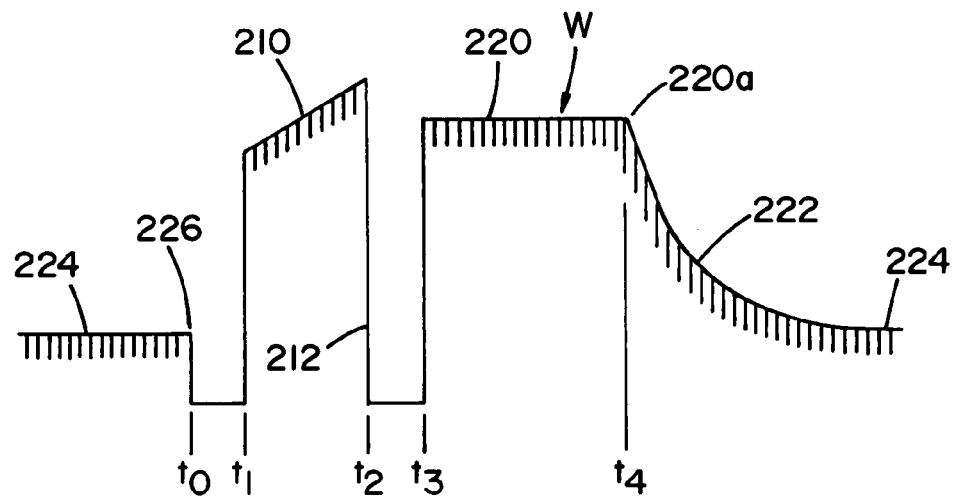
FIG. 6 is an example of one type of current wave form that can be used in practicing the present invention.

The general shape of the waveform produced by the STT welder 100 is illustrated in FIG. 6. The STT welder uses either a down chopper or the illustrated high speed, switching inverter 102 with a DC input link having a positive terminal 110 and a negative terminal 112. In the field, the STT welder or power supply is normally driven by a motor generator; however, this is not required. When a motor is used, the motor, such as a gas motor, powers a generator to produce an AC current. The AC current is then rectified by a rectifier to form a DC current. A phase controller typically controls the rectifier to produce a substantially uniform DC current. For simplicity, the input is illustrated in FIG. 5 as a rectifier 120 with a three-phase input power supply 122.

The output 130 of STT welder is used to melt and deposit metal cored electrode or welding wire 40 from a supply reel 132 advancing toward the open root 20 between two metal plates 12, 14 by an electric motor 134 driven at a selected speed to control the wire speed rate. In accordance with standard STT practice, a relatively small inductor 140 is provided in output 130 with a freewheeling diode 142 for the purposes of stabilizing the output welding procedure to follow the waveform. Waveform W, as shown in FIG. 6, is controlled by the voltage on control line 150 of inverter 102. This input or control line has a voltage determined by the output of pulse width modulator 152 operated at a rate exceeding 16 kHz by oscillator 160. Typically the rate of pulses on line 150 is substantially greater than 20 kHz. As such, inverter 102 outputs a rapid succession of current pulses created by oscillator 160 at a very high rate. Pulse width modulator 152 determines the width of each current pulse from inverter 102 to output 130. In accordance with standard STT practice, waveform W is determined by control circuit 200. The shapes of the pulse are controlled by the control circuit to thereby create a desired pulse with the DC current through output terminals 130. As can be appreciated, the power supply need not be a rectified output but can be any other appropriate DC source. This standard practice is shown generally in FIG. 10 of U.S. Pat. No. 5,742,029, which is incorporated herein by reference. The wave shape control circuit 200 has an output with a voltage that is compared to the voltage on line 202. This feedback voltage is representative of the arc current through metal cored electrode 40. A voltage representing arc voltage is generated by current sensor 204 receiving current information from shunt 206.

Waveform W as used in the present invention is a single welding cycle repeated successively as metal cored electrode 40 is melted and deposited between metal plates 12, 14. Waveform W, in accordance with STT technology, includes a short circuit portion including a metal transfer short circuit pulse 210 where the current is dropped when the metal being transferred is electrically necked down and then ruptured. After the rupture or "fuse," waveform W transitions into an arc or plasma portion, comprising a plasma boost or peak current 220 having a controlled maximum current 220a, a tailout portion or decaying potion 222 and a background portion 224. Background current is provided for sustaining the arc until the next short circuit at point 226 when the molten metal ball on the metal cored electrode 40 shorts against metal plates 12, 14 or against the bead B filling the open root 20. The welding of the metal plates 12, 14 is thus achieved by metal cored electrode 40 alternating between a short circuit condition when the metal cored electrode 40 shorts to metal plates 12, 14 and an arcing condition where the metal cored electrode 40 is spaced from the metal plates 12, 14. During the arcing condition, an electric arc is created between the metal plates 12, 14 and the metal cored electrode 40 for purposes of melting and maintaining molten the end of the electrode as it is fed toward the metal plates for a subsequent short circuit condition. This type of welding cycle is schematically illustrated in FIG. 6. The plasma boost or peak current portion of the current waveform affects the arc length during the welding process and the beadshape in the gap between the metal plates. The background current of the current waveform can be used to control the heat input during the welding process and to control the back beadshape of the root bead.

During the plasma boost or peak current condition, typically an arc is created and maintained to achieve smooth and effective welding. The welding cycle which is repeated several times per second is accurately controlled to reduce spatter at various times during the welding cycle. Pulse width modulator 152 operates at a high frequency with a width of the successive current pulses being determined by control circuit 200. As the feedback control system demands more current in the welding cycle, a higher voltage appears on a line to the pulse width modulator 152 to cause a wider pulse during the next pulse from the pulse width modulator 152. Thus, the demanded current for the welding cycle is rapidly changing many times each second. Since the highest rate of the welding cycle is generally about 100 to 400 cycles per second, many update pulses are provided during each welding cycle.

Figure 1:
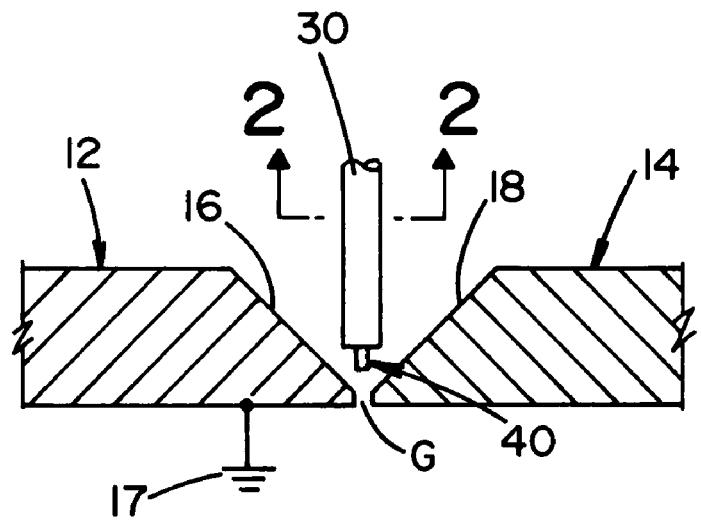
FIG. 1 is an enlarged partial view showing a gap between two metal plate ends and a metal cored electrode position in the gap to form a root bead.
Figure 2:
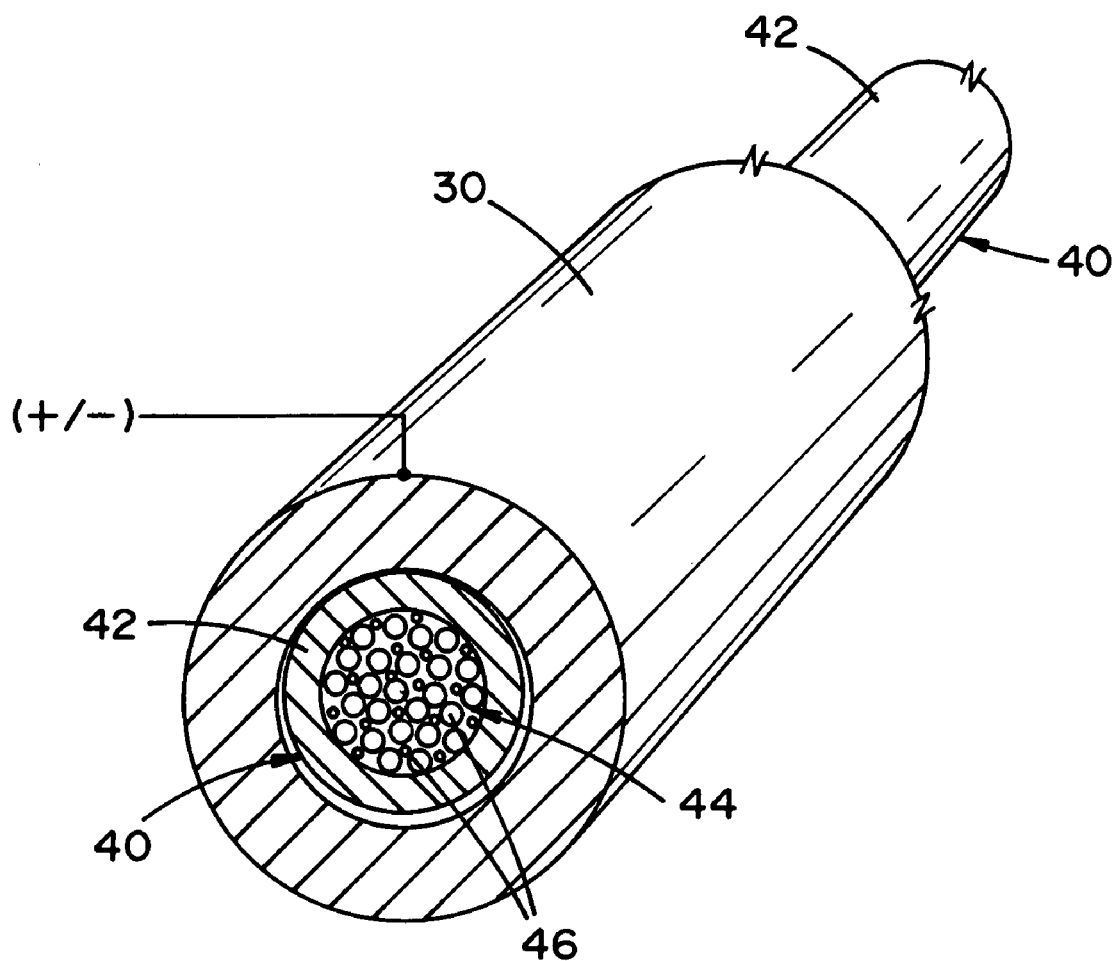
FIG. 2 is a cross sectional view along line 2-2 of FIG. 1 of the torch tip and the cored electrode therein.

Referring to FIGS. 1 and 2, metal plate sections 12, 14 each have edges that include a beveled surface 16, 18 which forms a gap G between the metal plate sections. The use of a bevel is not required. When a bevel is used, the angle of bevel formed by both surfaces is typically about 10-90°; however, other angles can be used. In one particular arrangement, each bevel is about 250 thereby forming a cumulative angle of bevel formed by both surfaces of about 50°. The metal plate edges are spaced apart such that a gap G exists between the metal plate edges. The width of the gap is typically about 1-5 mm. The thickness of the metal forming each metal plate is at least about 2 mm and typically about 4-20 mm, and more typically about 4-12 mm; however, other thicknesses can be used. The metal plate edges are positioned and secured together, typically by clamps until at least the root bead is applied to the gap between the metal plate edges, thereby filling the gap G. The offset of the edges of the metal plate section is typically less than about ±1 mm. A metal plate ground 17 engages the metal plate sections to complete the arc circuit between electrode 40 and the metal plate section. Electrode 40 is directed into the gap between the two metal plate sections by electrode tip 30. During the welding cycle, the electrode 40 is fed through electrode tip 30 so as to transfer the molten metal at the end of the electrode into the gap between the metal plate sections to form a root bead.

Referring to FIG. 2, electrode 40 is a consumable cored electrode which includes an outer metal sheath 42 and an electrode core 44. The metal electrode sheath 42 is typically made up of carbon steel, stainless steel or some other type of metal or metal alloy. The composition of the metal sheath can be selected to be similar to the base metal component of the metal plate sections; however, this is not required. Typically, the metal sheath is formed of mild steel and the composition of the electrode is adjusted by the fill in the core of the electrode. The electrode core 44 includes alloy metals 46 and little, if any fluxing agents. The alloy metals included in the electrode core 44 are typically in the form of metal powder having an average particle size of less than about 100 mesh. The weight percent of the alloy metals is typically about 10-60 weight percent of the total weight of the electrode. The alloying agents are typically selected such that the alloying agents in combination with the composition of the metal electrode sheath 42 form a weld bead having a composition substantially similar to the metal composition of the metal plates 12, 14 and/or form a weld bead having specific mechanical properties for use in a particular application.

Typically, the electrode core includes less than about 0.5 weight percent fluxing agents by total weight of the electrode. The absence or substantial absence of flux agents in the electrode core 44 results in little, if any, slag formation on the surface of the root bead. After the root bead has been formed, additional layers of weld metal are typically applied to fill the gap between the metal plate sections and complete the welding process for the metal plate sections. The existence of slag on the surface of the root bead can interfere with the bonding of the subsequently formed weld bead to the root bead, thereby adversely affecting the properties of the weld formed between the metal plate sections. Slag that is caught between weld metal layers is commonly referred to an inclusion. As such, electrodes that were used with flux agents and/or included flux agents left a slag that had to be removed prior to subsequent weld metal layers being applied to fill the gap. This slag cleaning process was both time consuming and labor intensive, and caused a significant delay in the completion of the filling of the gap with weld metal. The use of a metal cored electrode eliminates this slag removal problem by forming a root bead that has little, if any, slag on the surface of the root bead. As such, subsequent weld metal layers can be directly applied to the root bead without in prior cleaning.

The metal cored electrode can be used for both STT and other types of GMAW welding processes (e.g., D.C. pulse welding, short circuit welding, D.C. welding, A.C. welding, etc.). Typically the STT welding process is used to form the root bead and another type of GMAW welding process (e.g., pulse spray welding, etc.) is used to apply the subsequent weld metal layers until the gap between the metal plate sections are filled. As can be appreciated, the STT welding process can be used to completely fill the gap. The use of a single weld electrode for both the formation of the root bead and the filling of the gap reduces the time required to complete the welding of the metal plate sections, eliminates the need for different types of electrodes for different portions of the welding process, maintains the uniformity of the weld metal composition throughout the formation of the complete weld bead in the gap, and/or enables the welding process to be completely automated with the use of a single welder.

During the welding process, a shielding gas is used to protect the molten weld metal from the atmosphere. The shielding gas typically includes a combination of carbon dioxide and argon gas. In one non-limiting mixture, the shielding gas includes about 18-20% by volume carbon dioxide and about 80-82% by volume argon. An argon mixture is typically used so that a lower amount of current is needed to form the root bead, thereby reducing the amount of heat to the weld puddle that is forming the root bead. As can be appreciated, the composition of the shielding gas can be altered when applying subsequent weld metal layers to the root bead; however, this is not required.

Referring now to FIGS. 3-6, the operation of one non-limiting embodiment of the present invention is schematically illustrated. FIG. 6 shows a desired current profile to produce low spatter and to inhibit or prevent the weld metal forming the root bead from passing through gap G. This current profile is divided into a pinch portion, a plasma boost or peak current portion, a plasma portion and a background portion wherein the arc is to be maintained. In the current profile illustrated in FIG. 6, pinch portion 210 includes a premonition circuit operating point 212. The plasma boost or peak current portion 220 of the current profile includes a decaying or tailout portion 222 referred to as the plasma portion. The plasma boost or peak current portion, which is important to the operation of the spatter control system, is the constant current portion prior to the decay portion; however, the decaying portion 222 can be referred to as the end of the plasma boost or peak current portion or the start of the plasma portion. Following the decaying portion 222, the current control circuit shifts to the background current level 224 which maintains the plasma or arc. The current control circuit, in accordance with the present invention, maintains a preselected background current level, thereby preventing the current level through the arc from ever falling below the preselected current low current level and allowing the arc to extinguish. The background current can be controlled relative one or more variables such as, but not limited to, power, joules, sloped V/I characteristics, etc.

Figure 3:
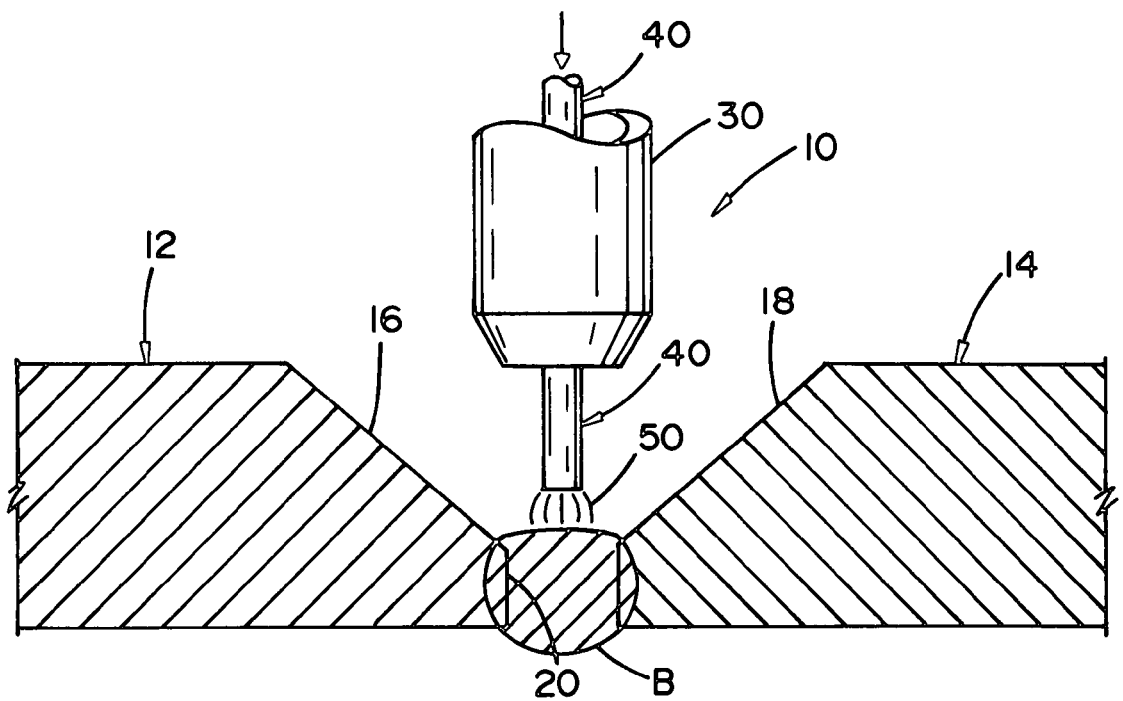
FIG. 3 is an enlarged partial view showing of the metal cored electrode passing through the torch movable along an open root between two metal plates.
Figure 4:
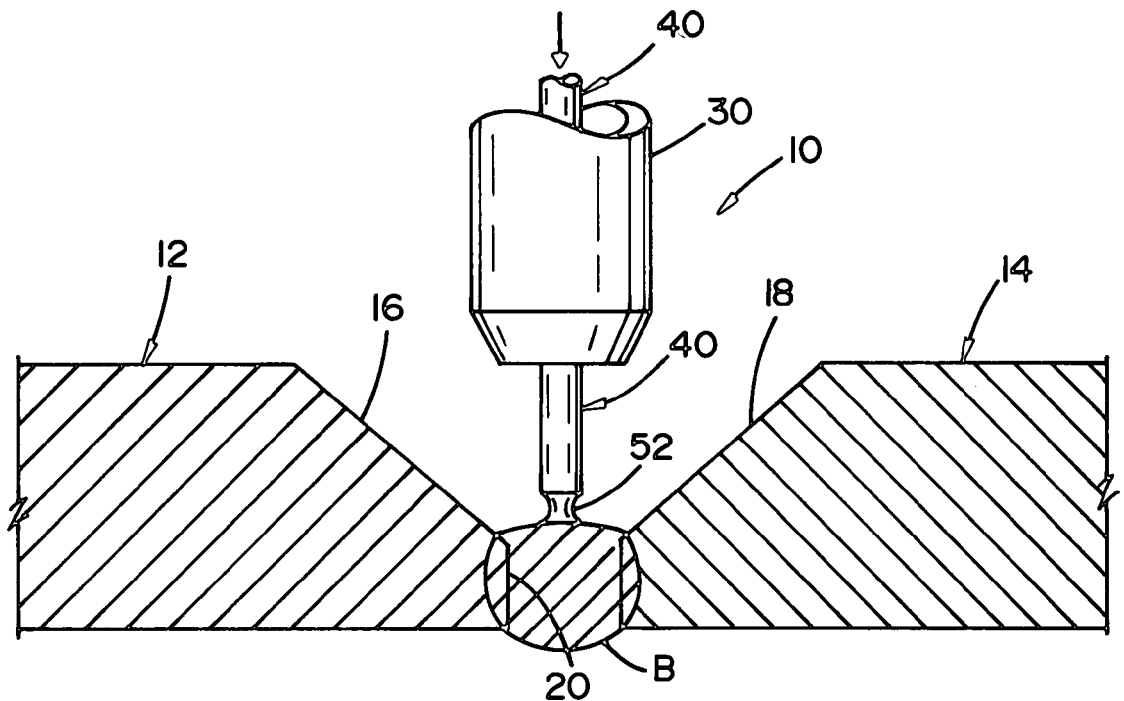
FIG. 4 is a view similar to FIG. 3 with the metal cored electrode in the short circuit, metal transfer condition.

During the formation of the root bead, the current control circuit is designed to produce all the melting of the electrode during the plasma boost or peak current and plasma portion of the welding cycle. Further melting of consumable electrode 40 typically does not take place when the background current level occurs since the IR necessary for melting the electrode is not obtainable through an arc maintained only by the background current. Thus, the background current primarily serves to maintain the arc and the ball of molten metal in the molten state. The amount of molten metal at the end of consumable electrode 40 which is formed by the plasma boost or peak current and plasma portion are selected to melt a preselected volume of molten metal at the end of the electrode, and the plasma portion of the current is reduced to the background current once the preselected volume is obtained. The duration of the plasma boost or peak current and/or plasma portion is also selected to prevent unnecessary melting of the metal around gap G of metal plate sections 12, 14. Such overmelting of the consumable electrode can result in the weld metal seeping fully through gap G. During the formation of the molten metal ball at the end of the consumable electrode during the plasma portion of the current, the jet forces of the high current repel the melted metal from the welding pool as illustrated in FIG. 3 until the preselected amount of molten metal has been melted at the end of the electrode. Once the current is reduced, the molten metal is allowed to form into a ball and the molten metal pool in the gap G is allowed to stabilize, thereby allowing for a smooth contact between the substantially spherical ball and the quelled weld metal pool. The desired amount of molten metal at the end of the electrode can be controlled by directing a preselected amount of current, energy or wattage into the electrode during the plasma portion of the welding cycle; however, this is not required. All during the time the molten metal ball is being formed at the end of the electrode, a shield gas is directed to the region about the weld metal to shield the molten ball and the weld metal in gap G from the atmosphere. The application of the shield gases is typically continued until the molten ball is transferred into the molten metal in gap G, and more typically throughout the welding process. The current density of the arc toward the center of the gap is reduced by the use of the metal cored electrode. The solid metal sheath acts as the principle electrical conduit of the arc current thereby increasing the current density on the outer region of the metal cored electrode. By concentrating the arc current on the metal sheath, the broom of the weld arc is increased, thereby directing more currently to the edges of the gap. The reduced amount of arc force at the center of the gap G reduces the incidence of the arc current pushing the molten weld metal fully through the gap. The increased broom of the arc also results in improved wetting of the edges of the gap to thereby improve the penetration of the root bead to the edges of the metal plate sections. In one non-limiting welding configuration, the diameter size of the consumable metal cored electrode for use in forming a root weld bead in the gap is at least about 0.0625 inch (1.6 mm) and the size ratio of the diameter size of the consumable metal cored electrode to the width of the gap is at least 0.25-1.4:1, and the ratio of the thickness of the metal sheath wall to the diameter of the metal cored electrode is about 0.25-0.75:1.

Once the molten metal ball is formed during the plasma boost or peak current and the plasma portion of the welding cycle, the molten ball is forced into the molten pool by feeding the consumable electrode into the weld pool, thereby forming a short circuit condition. When the melted metal ball shorts to the molten metal pool, the current output is increased using the STT shorting process. This shorting process acts to pinch the molten droplet from the electrode. A preemption circuit 212 predicts the release of the short circuit and reduces the current output to a lower level. This prediction of the short circuit can be at least partially based on dr/dt (where "r" is the electrode resistance), dp/dt, di/dt and/or dv/dt to indicate an upcoming break of a short circuit during the pinch cycle. Surface tension completes the transfer of the droplet from the electrode to the weld puddle and an arc is reignited between time $t_2$ and $t_3$. Since the short breaks into an arc at a low current, spatter is virtually eliminated.

In summary, the present invention is directed to the use of a metal cored electrode that is used with a short circuit welder such as STT welder to weld the root pass of open root welds. Open root welding applications, in accordance with the present invention can be used in the large fabrications or weldments. This segment includes heavy plate fabricators to pipe welding firms. The present invention is directed to an apparatus and method of forming a full penetration root pass for a beveled open root weld to be formed from one side of the beveled open root. Another non-limiting application of the present invention is the formation of a root bead for the first pass of a double sided joint. By using the welding process and configuration of the present invention for such an application, the need back-gouge after forming the root bead can be eliminated. The prior art accepted method for full penetration bevel butt welding generally involves multiple processing steps such as the use of backing material (e.g., backplates, etc.) and/or a flux dam to support the backside of the gap while the root pass is being performed. In many cases, once the initial welding pass has been completed, the metal plates must be flipped or turned over to back gouge or repair the opposite side of the weld bead formed by the initial welding pass. Once back gouging is completed, an additional welding pass is performed to ensure proper penetration and a presence of a back bead. The method and apparatus of the present invention is a process of forming a root pass from the open bevel side of an open root joint while establishing a reenforced back bead. The single step process is designed to eliminate the cost of materials and time involved in performing the multiple steps for forming the root bead. The ability to weld from one side also eliminates the need to flip heavy plate or perform back bead gouging techniques to ensure full penetration. The welding process further eliminates the need for using weld joint backing systems such as backing strips or similar backing systems. In some welding operations, the metal plates cannot be flipped of turned. In other welding operations such as pipe welding, the pipe size is too small for the use of backing plates and/or to provide access to the opposite side of the root pass. The welding method and apparatus of the present invention can be used to achieve a welding operation from the beveled side of a joint in a workpiece and to produce sidewall penetration into the immediate root area while establishing a reinforced back head. The welding method and apparatus produce smoother weld beads on the backside of the metal plates. A shielding gas such as a mixture of carbon dioxide and argon and the use of an ExxC-XX electrode (e.g., E70C6M, etc.) or similar consumable metal cored electrode can be used to form the root bead in accordance with the present invention. As can be appreciated, other shielding gasses and/or other types of metal cored electrode compositions can be used. The method and apparatus of welding of the present invention can form a weld bead in an open root at a variety of welding angles (e.g., vertical up, vertical down, etc.).

Figure 7:
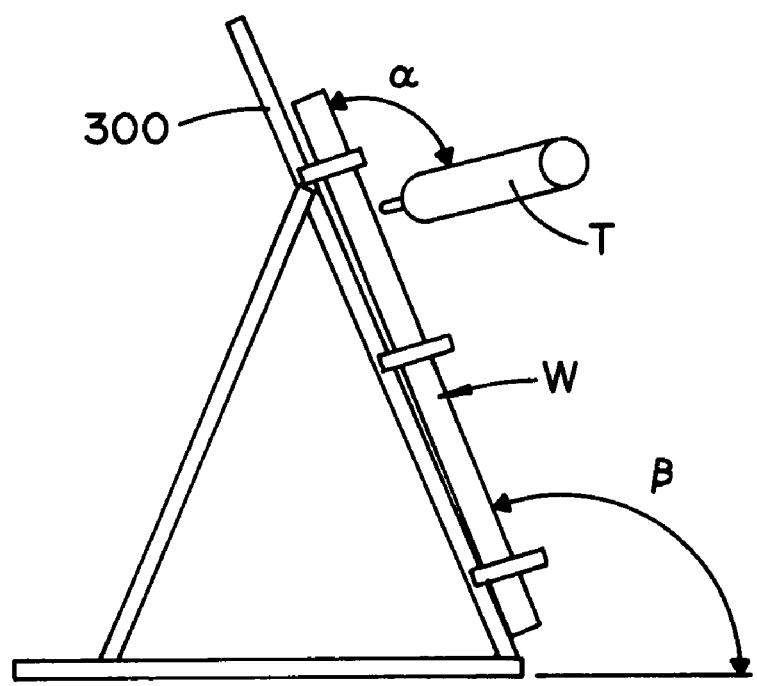
FIG. 7 is a non-limiting example of a setup for welding together two plates; and, FIG. 8 illustrates a non-limiting joint configuration for the two metal plates of FIG. 7.
Figure 8:
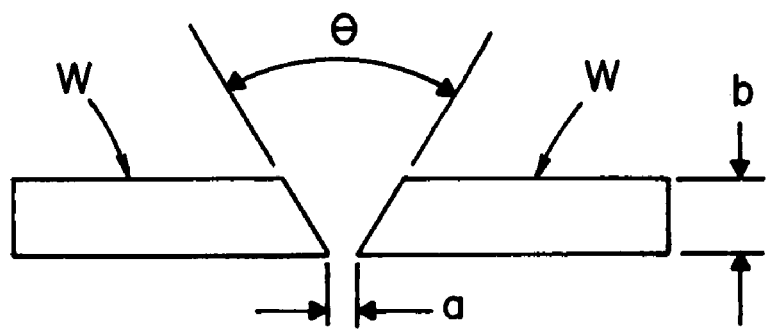

In one non-limiting example of the method and apparatus of the invention welding, FIGS. 7 and 8 illustrate the formation of an open root weld being formed between two metal plates. FIG. 7 illustrates a welding fixture 300 used to hold the two beveled steel plates W in an open root weld configuration. The plates were oriented such that both plates were held at about 30° from a vertical incline or about 120° l from the floor as indicated by angle β. As it can be appreciated, other incline angles could have been used. The metal plates were oriented such that the plate alignment was within about ±1 mm. As can be appreciated, other plate alignment parameters could have been used. The metal plates were carbon steel plates having a thickness of about 10 mm as indicated by thickness b in FIG. 8. The metal plates were also spaced about 1-5 mm apart from one another as indicated by spacing "a" as shown in FIG. 8. As can be appreciated, other metal plate thicknesses, other plate spacing, and/or compositions (e.g., stainless steel, low carbon steel, various alloy steels, etc.) could have been used. As can also be appreciated, the plate thickness of the two metal plates could be the same or different. The bevel angle was about 50° as indicated by angle θ in FIG. 8. As can be appreciated, other angles can be used. As illustrated in FIG. 8, the beveled angle did not include a land. As can be appreciated, other bevel angles or no bevel angle could have been used. As can also be appreciated, the gap could have included a land. A welding torch T was used to form the weld bead. In one non-limiting configuration, a Fanuc LR-Mate 200iL robot welder equipped with a Lincoln Power Wave 455/STT power source and a Lincoln Power Feed 10R wire feeder was used to provide the welding power to the consumable metal cored electrode and to move the electrode in the open root between the metal plates. As can be appreciated, other types of short circuit welders and/or wire feeders could be used. The torch T is positioned at about a 100° angle relative to the metal plates W as indicated by angle α. As can be appreciated, other angles can be used. As can also be appreciated, other mechanized travel systems could have been used and/or a semiautomatic arrangement could have been used to form the root bead (e.g., seamers, side beams, pipe bug, band units, other types of robot arms, etc.). The metal cored electrode used to form the root bead was a 1/16 inch Lincoln Metalshield MC-706 that included substantially no flux agents. As can be appreciated, other types of consumable metal cored electrodes having little or no flux agents could have been used. The shield gas used during the welding process was about 82% by volume argon and about 18% by volume carbon dioxide. As can be appreciated, other gas mixture ratios could have been used, and/or other or additional shielding gasses could have been used. Table A below illustrates the welding parameters used to form successful root beads in gap sizes ranging between 1-5 mm. As can be appreciated, other gap widths could have been used. As can also be appreciated, other welding parameters could have been used to form a successful root bead.

TABLE A

| Welding Parameters | Gap Size | | | | |
|---|---|---|---|---|---|
| | 1 mm | 2 mm | 3 mm | 4 mm | 5 mm |
| STT | 164 | 164 | 164 | 164 | 164 |
| WFS | 120 | 120 | 120 | 120 | 120 |
| Peak | 420 | 420 | 420 | 420 | 420 |
| Background | 100 | 100 | 100 | 100 | 100 |
| Tailout | 6 | 6 | 6 | 6 | 6 |
| Travel Speed | 17ipm | 15ipm | 12ipm | 10ipm | 8ipm |
| Weave Frequency | N/A | N/A | 1.5 Hz | 1 Hz | 0.5 Hz |
| Weave Amplitude | N/A | N/A | 1.5 mm | 2 mm | 2.5 mm |
| Dwell | 0 | 0 | 0 | 0 | 0 |
| Torch Travel Angle | 10° Drag | 10° Drag | 10° Drag | 10° Drag | 10° Drag |
| Torch Joint Angle | 90° to Plate | 90° to Plate | 90° to Plate | 90° to Plate | 90° to Plate |
| Electrode Stand Off | ½ inch | ½ inch | ½ inch | ½ inch | ½ inch |

As established above, successful root beads were formed at varying travel speeds and with different gap widths and plate alignments. The formed root bead exhibited good bead appearance and back bead reinforcement. The formed root beads also had a good penetration profile.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to a preferred embodiment. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A method of forming a root bead in a gap between spaced ends of at least one workpiece, said gap including an open root, said method comprising:
    a) selecting a metal cored electrode, said metal cored electrode including a metal sheath and core materials, said core material including at least about 0.5 weight percent alloying agent no more than about 2 weight percent slag forming agent;
    b) advancing said metal cored electrode at a given wire feed rate toward said open root to weld said ends together by at least partially filling said open root in a first weld pass;
    c) creating a welding current with a controlled short circuit waveform, said short circuit waveform including a succession of welding cycles each having a short circuit portion and a plasma arc portion;
    d) moving said metal cored electrode along said open root as said welding current is passed through said metal cored electrode to melt the metal cored electrode and transfer the melted metal cored electrode to said ends in said open root to form a root bead, said root bead having an upper surface that includes little or no slag; and,
    e) applying a shielding gas to at least partially protect molten metal in said open root from the atmosphere.

2. The method as defined in claim 1, wherein said open root is formed by the spaced ends of two pipes.

3. The method as defined in claim 1, wherein said open root is formed by the spaced ends of two metal plates.

4. The method as defined in claim 1, wherein said step of advancing said selected metal cored electrode substantially fills said open root in said first weld pass.

5. The method as defined in claim 1, wherein said plasma arc portion includes a plasma boost segment and a background current segment.

6. The method as defined in claim 1, including the step of applying at least one additional layer of weld metal in said gap after said open root has been at least partially filled.

7. The method as defined in claim 6, wherein said waveform of said current for applying at least one additional layer of weld metal in said gap is different from the waveform of said current for at least partially filling said open root in a first weld pass.

8. The method as defined in claim 7, wherein said waveform of said current for at least partially filling said open root in a first weld pass includes an STT waveform, and said waveform of said current for applying at least one additional layer of weld metal in said gap is not an STT waveform.

9. The method as defined in claim 6, wherein said consumable metal cored electrode for applying at least one additional layer of weld metal in said gap is the same as the consumable metal cored electrode to at least partially fill said open root.

10. The method as defined in claim 1, wherein said core material includes less than about 0.5 percent slag forming agent by total weight of said electrode.

11. The method as defined in claim 10, wherein said core material includes substantially no slag forming agent.

12. The method as defined in claim 1, wherein said shield gas includes carbon dioxide, argon, helium, oxygen, or combinations thereof.

13. The method as defined in claim 12, wherein said shield gas includes a majority volume percent argon.

14. The method as defined in claim 1, including the step of aligning said spaced ends by use of an alignment arrangement, said edges of said spaced ends off set by less than about ±5 mm.

15. The method as defined in claim 14, wherein said edges of said spaced ends off set by up to about ±1 mm.

16. The method as defined in claim 1, wherein said spaced ends form said open root of at least about 0.5 mm.

17. The method as defined in claim 16, wherein said spaced ends form said open root of about 1-5 mm.

18. The method as defined in claim 1, wherein said metal cored electrode is an ExxC-XX electrode.

19. The method as defined in claim 1, wherein a size ratio of a diameter of said metal cored electrode to a width of said gap of said open root is about 0.1-2:1.

20. The method as defined in claim 1, wherein said metal cored electrode has a diameter and a wall thickness, a size ratio of said wall thickness to said diameter is less than about 0.9:1.

21. A method of forming a root bead in a gap between spaced ends of at least one workpiece, said gap including an open root, said method comprising:
  a) selecting a metal cored electrode, said metal cored electrode including a metal sheath and core materials, said core material including at least about 0.5 weight percent metal alloying agent and less than about 0.5 weight percent slag forming agent content by total weight of said electrode, said metal cored electrode having a diameter and said gap having a width and a size ratio of said diameter of said metal cored electrode to said width of said gap of said open root is about 0.1-2:1;
  b) advancing said metal cored electrode at a given wire feed rate toward said open root to weld said ends together by substantially filling said open root in a first weld pass, said open root having a gap size of about 1-6 mm, said spaced ends off set by less than about ±3 mm;
  c) creating a welding current that includes an STT waveform;
  d) moving said metal cored electrode along said open root as said welding current is passed through said metal cored electrode to melt the metal cored electrode and transfer the melted metal cored electrode to said ends in said open root to form a root bead, said root bead having an upper surface that includes little or no slag; and,
  e) applying a shielding gas to at least partially protect molten metal in said open root from the atmosphere, said shielding gas including argon, carbon dioxide, helium, oxygen, or combinations thereof.

22. The method as defined in claim 21, including the step of applying at least one additional layer of weld metal in said gap after said open root has been substantially filled.

23. The method as defined in claim 22, wherein said waveform of said current for applying at least one additional layer of weld metal in said gap is different from the waveform of said current for substantially filling said open root in a first weld pass.

24. The method as defined in claim 23, wherein said waveform of said current for applying at least one additional layer of weld metal in said gap is not an STT waveform.

25. The method as defined in claim 23, wherein said consumable metal cored electrode for applying at least one additional layer of weld metal in said gap is the same as the consumable metal cored electrode to at least partially fill said open root.

26. The method as defined in claim 21, wherein said wire feed rate is variable.

27. An apparatus for forming a root bead in a gap between spaced ends of at least one workpiece, said gap including an open root, said apparatus comprising:
  a) a metal cored electrode that includes a metal sheath and core materials, said core material including at least about 0.5 weight percent metal alloying agent and less than about 0.5 weight percent slag forming agent content by total weight of said electrode, said metal cored electrode having a diameter and said gap having a width and a size ratio of said diameter of said metal cored electrode to said width of said gap of said open root is about 0.1-2:1;
  b) a wire feeder to advance said metal cored electrode at a given wire feed rate toward said open root to weld said ends together by substantially filling said open root in a first weld pass, said open root having a gap size of about 1-6 mm, said spaced ends off set by less than about ±3 mm;
  c) a power supply and welding circuit to create a welding current that includes an STT waveform;
  d) a mechanized travel system to move a welding torch and said metal cored electrode along said open root as said welding current is passed through said metal cored electrode to melt the metal cored electrode and transfer the melted metal cored electrode to said ends in said open root to form a root bead, said root bead having an upper surface that includes little or no slag; and,
  e) a shielding gas that is directed to said open root to at least partially protect molten metal in said open root from the atmosphere, said shielding gas including argon, carbon dioxide, helium, oxygen. or combinations thereof.

28. The method as defined in claim 21, wherein said metal cored electrode has a diameter and a wall thickness, a size ratio of said wall thickness to said diameter is less than about 0.9:1.

29. The apparatus as defined in claim 27, wherein said metal cored electrode has a diameter and a wall thickness, a size ratio of said wall thickness to said diameter is less than about 0.9:1.

* * * * *